(12) United States Patent
Gottschalk et al.

(10) Patent No.: US 6,445,971 B1
(45) Date of Patent: Sep. 3, 2002

(54) MACHINE FOR TOOLING SMALL PARTS

(75) Inventors: Charles E. Gottschalk, Whitehouse; Mark R. Kolkemeyer, Woodville, both of OH (US)

(73) Assignee: Glassline Corporation, Perrysburg, OH (US)

( * ) Notice: Subject to any disclaimer, the term of this patent is extended or adjusted under 35 U.S.C. 154(b) by 0 days.

(21) Appl. No.: 09/443,744

(22) Filed: Nov. 19, 1999

(51) Int. Cl.[7] .......................... G06F 19/00; B23Q 3/155
(52) U.S. Cl. .......................... 700/159; 700/164; 483/1; 483/15
(58) Field of Search .................... 700/159, 164, 700/187, 192; 483/1, 15, 39, 42, 52

(56) References Cited

U.S. PATENT DOCUMENTS

| | | | | |
|---|---|---|---|---|
| 3,576,540 A | * | 4/1971 | Fair et al. ....................... | 700/9 |
| 3,945,230 A | * | 3/1976 | Tomioka et al. ................ | 483/1 |
| 4,736,512 A | * | 4/1988 | Gusching et al. ............. | 483/14 |
| 5,967,879 A | * | 10/1999 | Gottschald ..................... | 451/5 |

* cited by examiner

Primary Examiner—Leo Picard
Assistant Examiner—Sheela S Rao
(74) Attorney, Agent, or Firm—Emch, Schaffer, Schaub & Porcello Co., L.P.A.

(57) ABSTRACT

This machine tool such as CNC edge grinding apparatus is an apparatus for machining small glass parts such as a side view mirror. For small parts, grind time can exceed by a considerable amount the load/unload time. This machine greatly increases the output of the system. It minimizes the waiting time by providing an auxiliary station for simultaneous unloading/loading while grinding. Controls integrate multiple axes, which are part of the holding mechanisms, with the linear axes of the grind head, to grind the part.

13 Claims, 8 Drawing Sheets

MACHINE FOR TOOLING SMALL PARTS

TECHNICAL FIELD

This apparatus relates to a machine such as a computer numerically controlled (CNC) machine. More specifically, the invention relates to a machine for machining small glass parts such as a side view mirror.

BACKGROUND ART

Machine tools such as an edge grinding apparatus typically include a grinding wheel, a holder for a blank, and a CNC device for controlling the grinding of the blank according to selected specification. The CNC machine tool may include a multi-axis, linear (X, Y axis) holder or a rotatable holder and a vertical (axis Z). The machine does not have to be limited to a CNC controlled machine, but could also be a cam design for use with simpler controls. The cutting tool is not restricted to standard turning or milling cutters, but also includes all mechanical, electronic and/or electromechanical devices used to modify the shape and/or properties of the workpiece. Examples of cutting tools include: endmills, turning tools, grinding wheels, laser cutting beams, plasma beams and punch tools.

In a standard CNC glass grinding machine, the next raw part is held by a shuttle or operator, waiting for the machine to finish the current part. When the current part is complete, a clamp and/or vacuum must release and a shuttle or operator must unload the finished piece before loading the next raw part. After the next raw part is loaded and located, the vacuum and/or clamp must grab the part before the cycle can start.

The transferring, locating, relocating and aligning of parts requires time (loading time). For small parts, this loading time may even exceed the processing time. Current solutions use fine adjustment cylinders sensors, fine adjustment vacuum sensors and high speed shuttles to minimize the load time. Even with the best adjustment, most current systems require 6 or more seconds to load the parts. Some mirror parts can be processed in 3 to 5 seconds.

DISCLOSURE OF INVENTION

For small parts, grind time can exceed by a considerable amount the load/unload time. This greatly reduces the output of the system. This invention minimizes the waiting time by providing an auxiliary station for simultaneous unloading/loading while grinding. The apparatus comprises a means to locate the part away from the grinding head and accurately hold and index the part to the grind point. The apparatus also includes the integration of two stations into one by the use of multiple axis'. The CNC grinder head with high speed spindle for small internal radii is mounted to a linear horizontal axis X and linear vertical axis Z. Controls integrate the correct second axis Y, which is part of the holding mechanism, with the horizontal and vertical linear axis of the grind head, to grind the part.

A rotating table is used to rotate the two part holding mechanisms.

The table rotates +/−180°. Attached to the table are two glass locating/holding systems which also incorporate the second axis of the CNC system. Each position consists of a rotary servo axis, a lower vacuum pad, an upper vacuum clamp pad with ram and pneumatic cylinder. A locating means is also provided at the lower side of the vacuum pad or prior to the loading shuttle.

The part is loaded and located onto the outer positioned station, and the system is signaled that the part is ready.

Vacuum switches on and the table will rotate, presenting the outer station to the grind head, at the same time presenting the previously finished part to the outside. During rotation, the outer station will clamp and the inner station will release. The grinding head will commence grinding of the new part. At the same time, the part is raised with vacuum, on the clamp. The operator (or automatic load system), loads a new part onto the vacuum pad, and then takes the finished part from the raised clamp. The system is signaled that the fresh part is ready when the other station is done grinding, the rotation occurs again.

BEST MODE OF CARRYING OUT INVENTION

Figure 1:
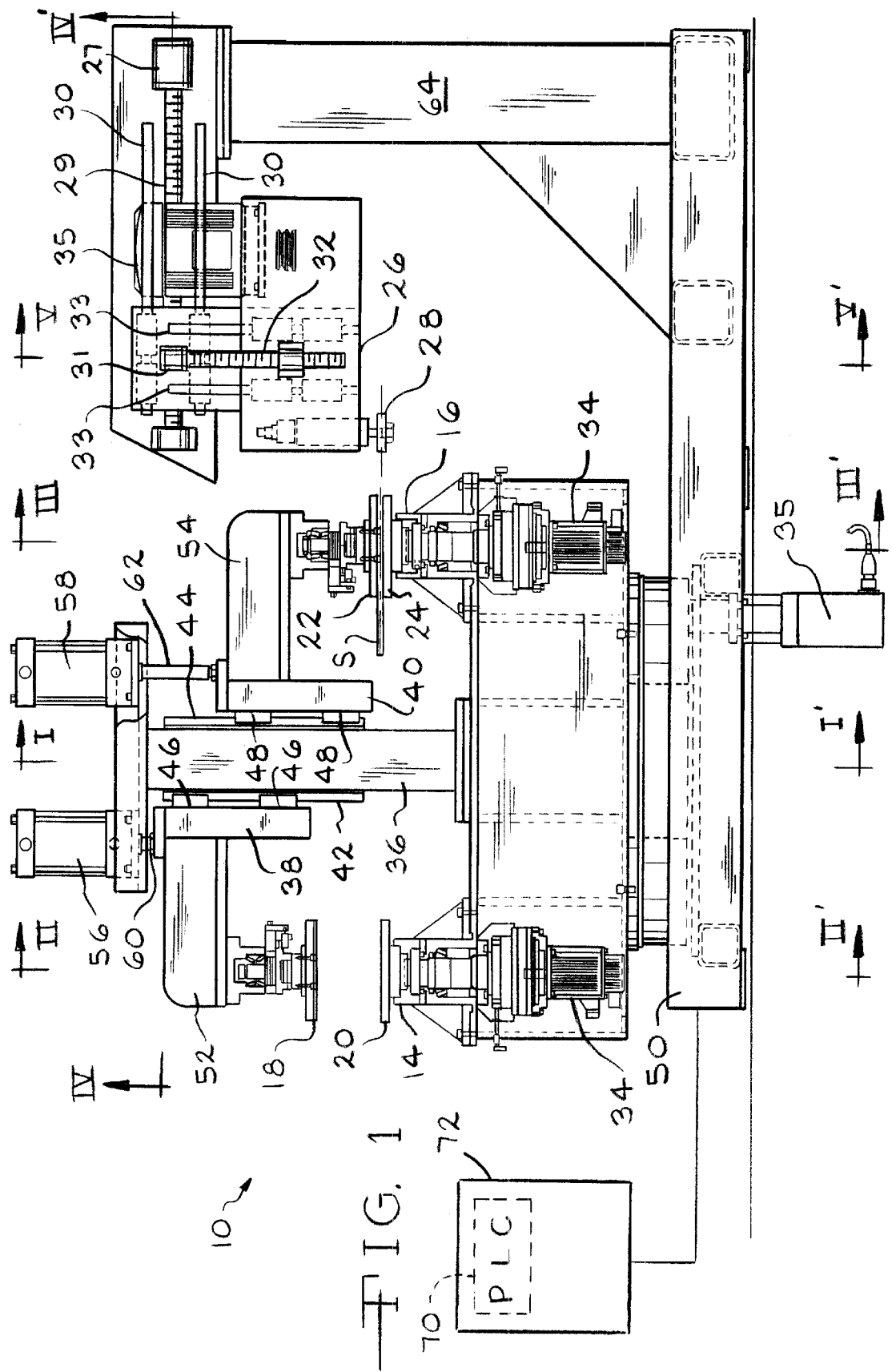
FIG. 1 is a side elevational view of a CNC machine tool according to the present invention having a rotating index table.

FIG. 1 is a side elevational view of CNC machine tool 10 such as a edge grinding apparatus. CNC tool 10 subjects an article to blank S such as a sheet of glass to an edge grinding operation in an endless pattern around the periphery of the article. Blank S may have an irregular shape or bend. CNC tool 10 includes rotating index table 12 which rotates 180° about vertical axis I–I'. Table 12 supports CNC station 14 and CNC station 16. CNC station 14 includes clamps 18 and 20 which hold blank S in station 12. Clamp 18 moves vertically along axis II–II' in a linear, straight line direction. CNC station 16 includes clamps 22 and 24 which hold blank S in station 16. Clamps 22 and 24 move vertically along axis III–III' in a linear, straight line direction.

Grinding station 26 is located adjacent axis III–III'. While grinding station 26 machines blank S located along axis III–III', finished blank S simultaneously is unloaded and a new blank S is loaded at the CNC station located along axis II–II'.

Grinding station 26 includes rotary grinder wheel 28. Servo motor 27 moves grinding station 26 in a linear, horizontal direction along axis IV–IV' through ball screw drive 29 along linear rails 30. Servo motor 31 moves grinding station 26 in a linear, vertical direction along axis V–V' through ball screw drive 32 along linear rails 33.

Frame 50 supports table 12 and stations 14 and 16. Motor 34 rotates table 12 180° about axis I–I'. Frame 50 also includes vertical beam 36 which includes two vertical track roller linear guidance systems 38 and 40. Systems 38 and 40 include guide rails 42 and 44 attached to frame 36. Connectors 46 and 48 attach to linear systems 38 and 40, respectively. Connectors 46 and 48 slidably engage guide rails 42 and 44 respectively. Connectors 46 and 48 typically have a C-shaped cross-section. Rails 42 and 44 may include a grove to engage the ends of C-shape.

In another embodiment, linear systems 38 and 40 may include a cavity housing linear ball bearings. Grooved rollers in connectors 46 and 48 would be in free-wheeling engagement with the ball bearings in the cavity. The rollers would slide along rails 42 and 44 attached to frame 36.

Arms 52 and 54 connect clamp 18 and 26 to systems 38 and 40 respectively. Air cylinders 56 and 58, assemblies 38 and 40 respectively through cylinder rods 60 and 62. Other linear motion technology also may be used.

FIG. 1 also shows control 70, a programmable controller (PLC), and a power control panel 72 operate machine 10 through conventional circuitry not shown. Control 70 signals table 12, station 14, station 16, the clamps, grinder 28, the various motors, drives and the remainder of the components of machine 10 to coordinate the loading, unloading and machining blank S while maintaining the X, Y and Z axes path. Power control panel 72 is wired to conventional motors drive shafts and drive chains (not shown) for the operation of machine 10.

Figure 2:
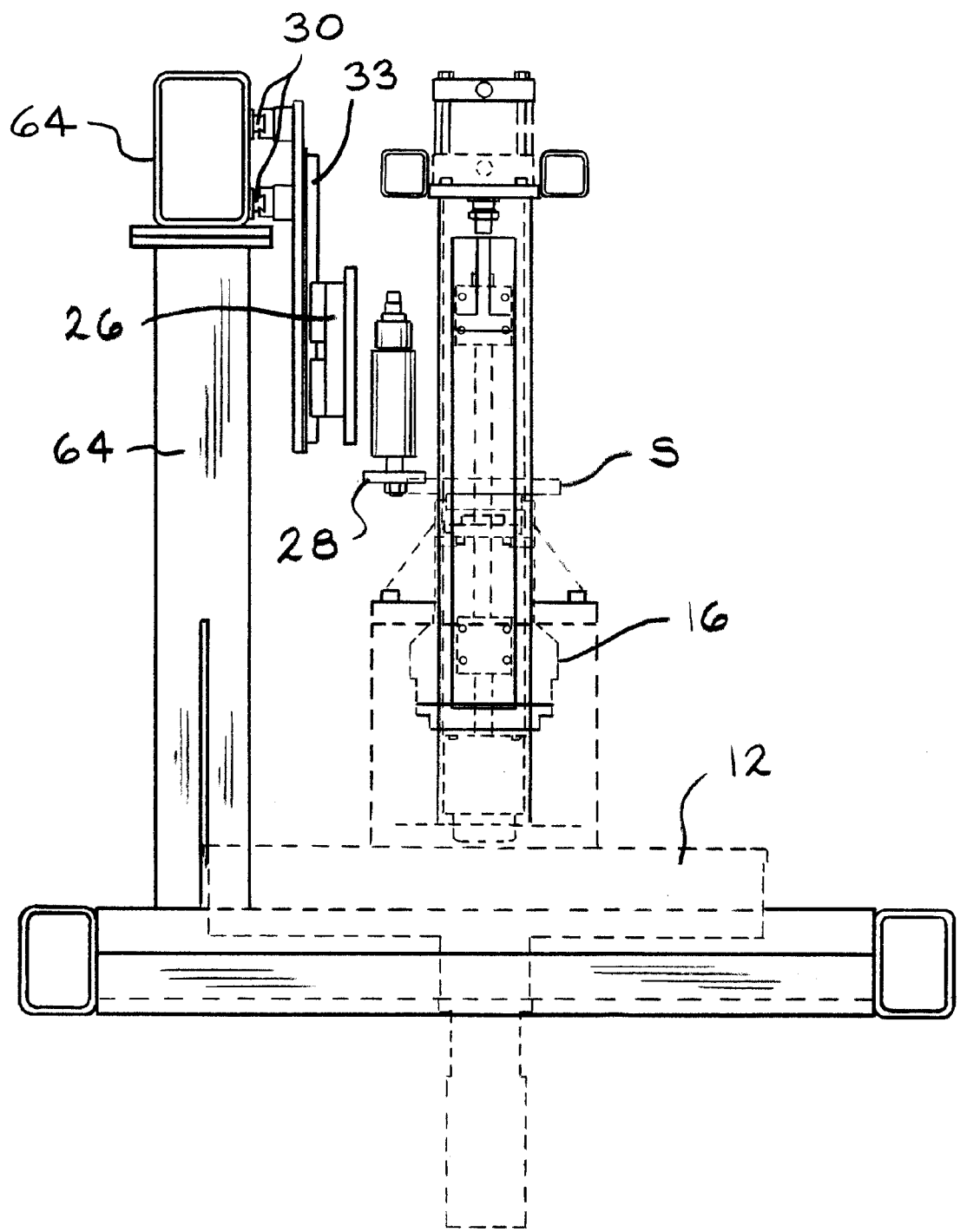
FIG. 2 is an end view of the CNC machine tool according to the present invention having a multi axis linear holder.

FIG. 2 is an end view showing the relationship of rotary grinder wheel 28, blank S and CNC station 16 in greater detail. Frames 64 supports grinding station 26.

Figure 3:
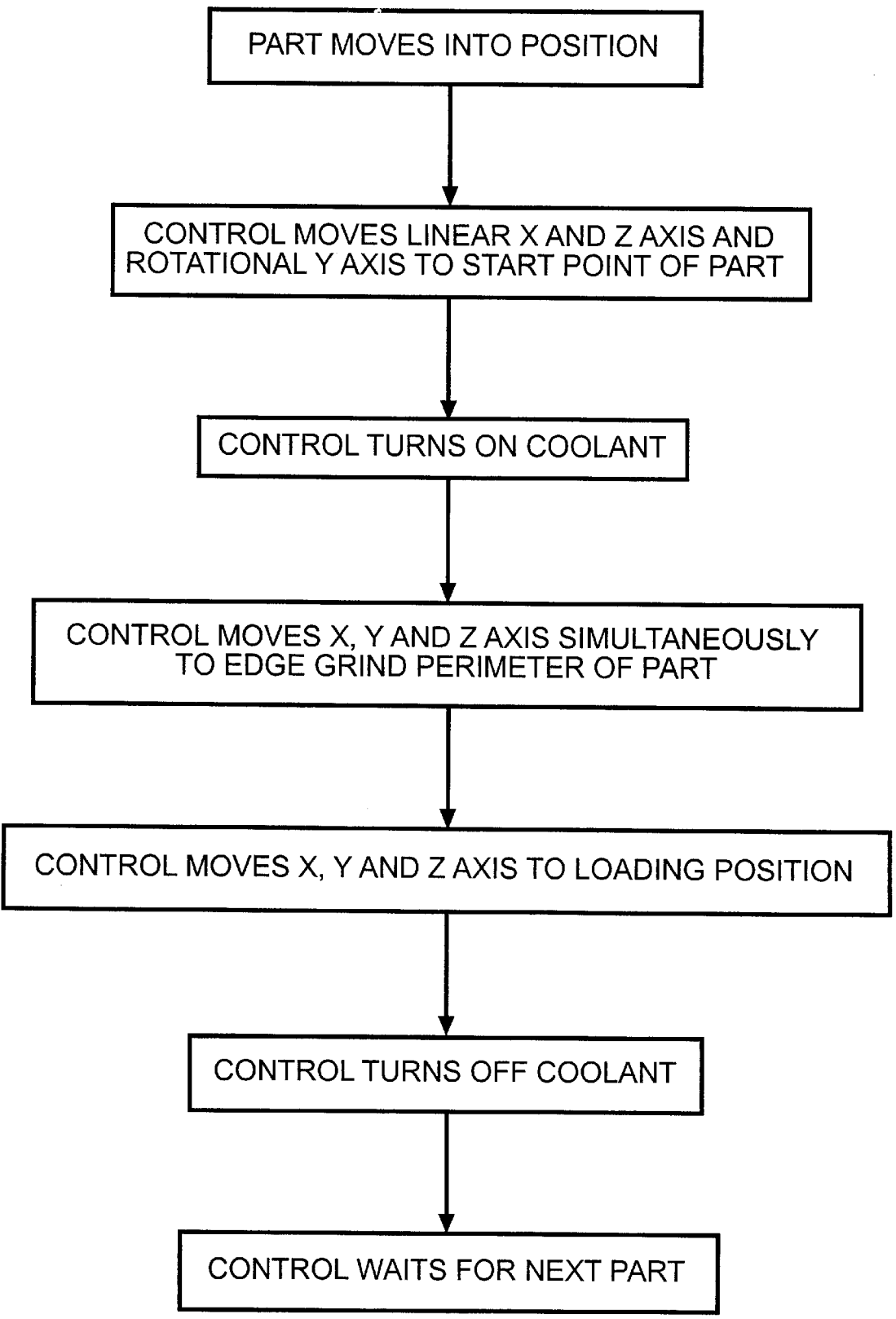
FIG. 3 is a partial exploded side view of one CNC station.

FIG. 3 is an exploded side view showing the relationship of rotary table 12 and CNC station 14 in greater detail.

Figure 4A:
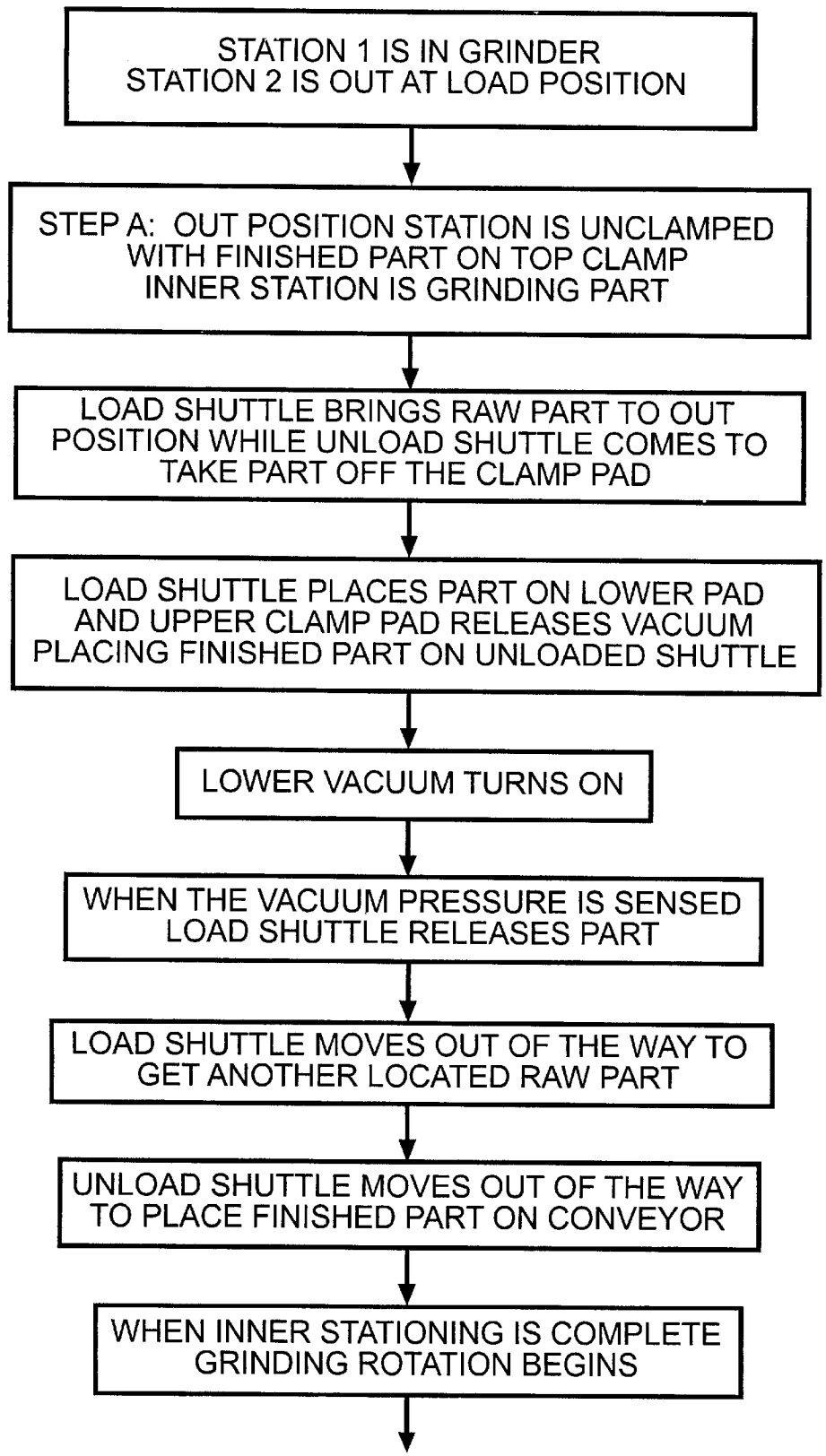
FIG. 4 is a cross-sectional top view of the rotating index table.
Figure 4B:
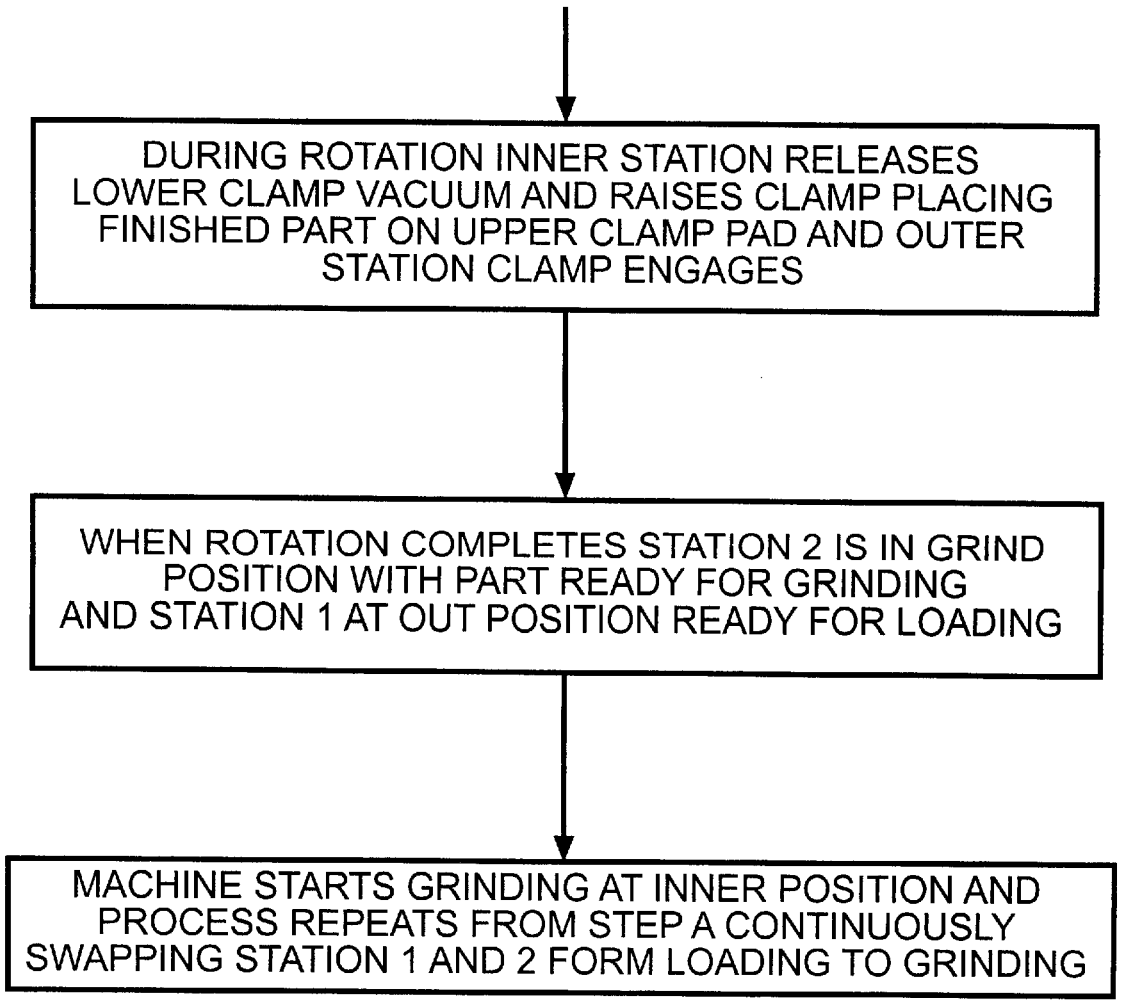

FIG. 4 is a top view of rotary table 12 in greater detail. Preferably, table 12 is rectangular in shape. However, it may be round, square or the like. FIG. 4 shows the positioning of stations 14 and 16 and shaft 36 on table 12.

Figure 5:
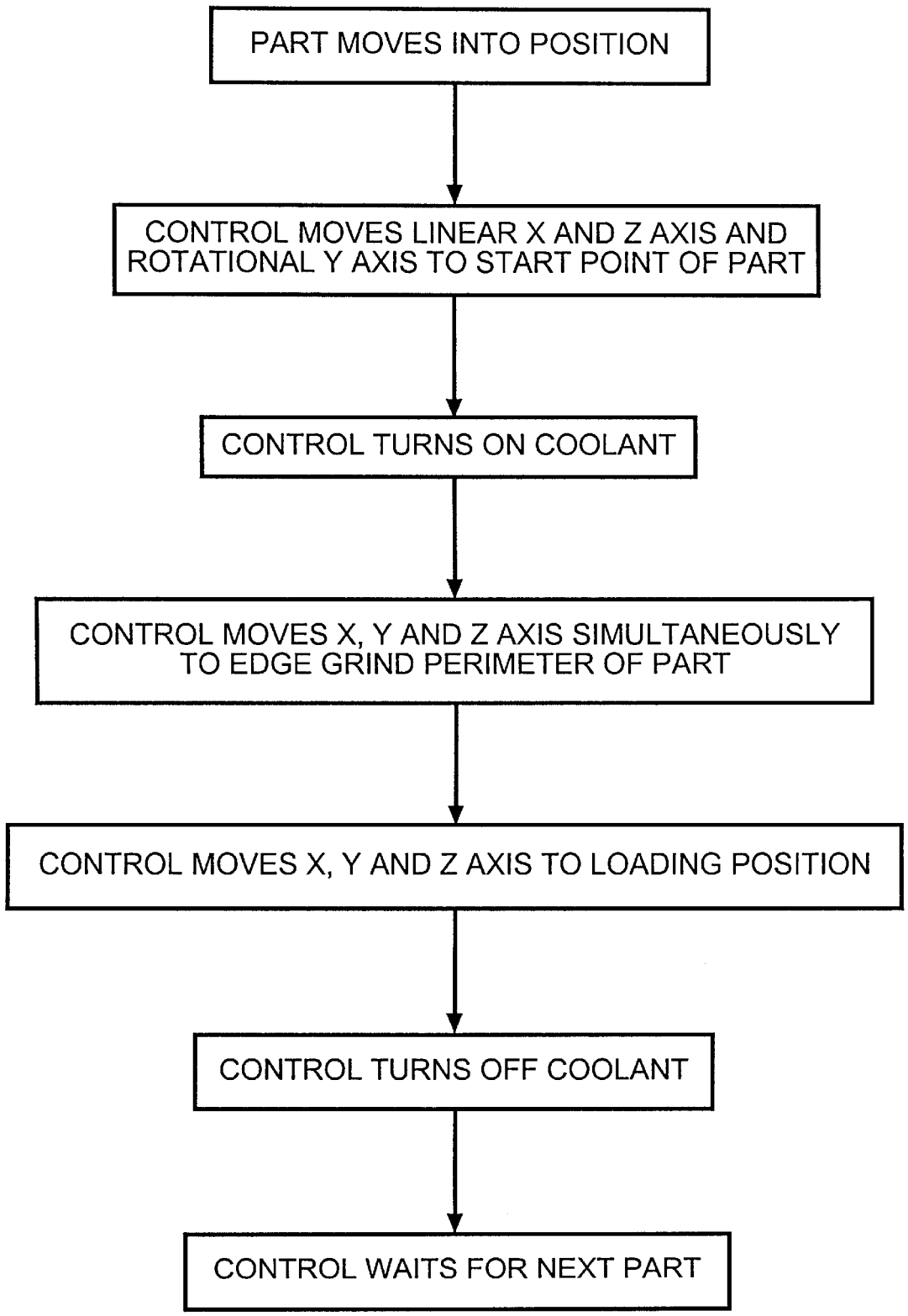
FIG. 5 is a logical flow chart for positioning and operating the CNC machine tool.

FIG. 5 is a logical flow chart for positioning and operating rotary grinding wheel 28. First, a part moves into position, then the control moves the linear X and Z axis and the rotation Y axis to the start point of the part (glass). Next, the control turns on coolant. The control then moves the X, Y and Z axis simultaneously to edge grind the perimeter of the part (side view mirror). The control then moves the X, Y and Z axis to the loading position. Finally, the control turns off the coolant and waits for the next part.

Figure 6A:
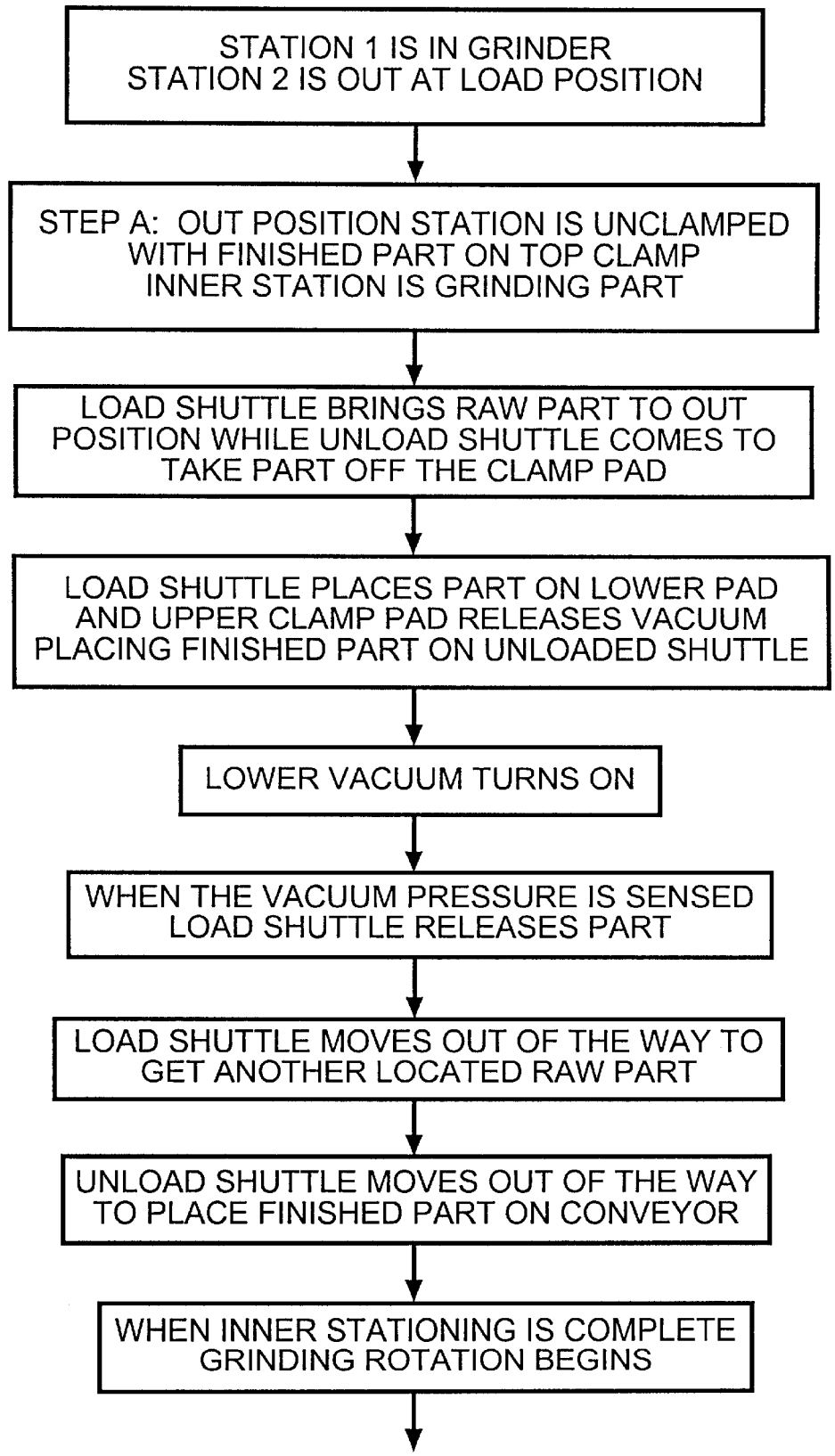
FIGS. 6A and 6B are a logical flow chart for positioning and operating the two CNC stations.
Figure 6:
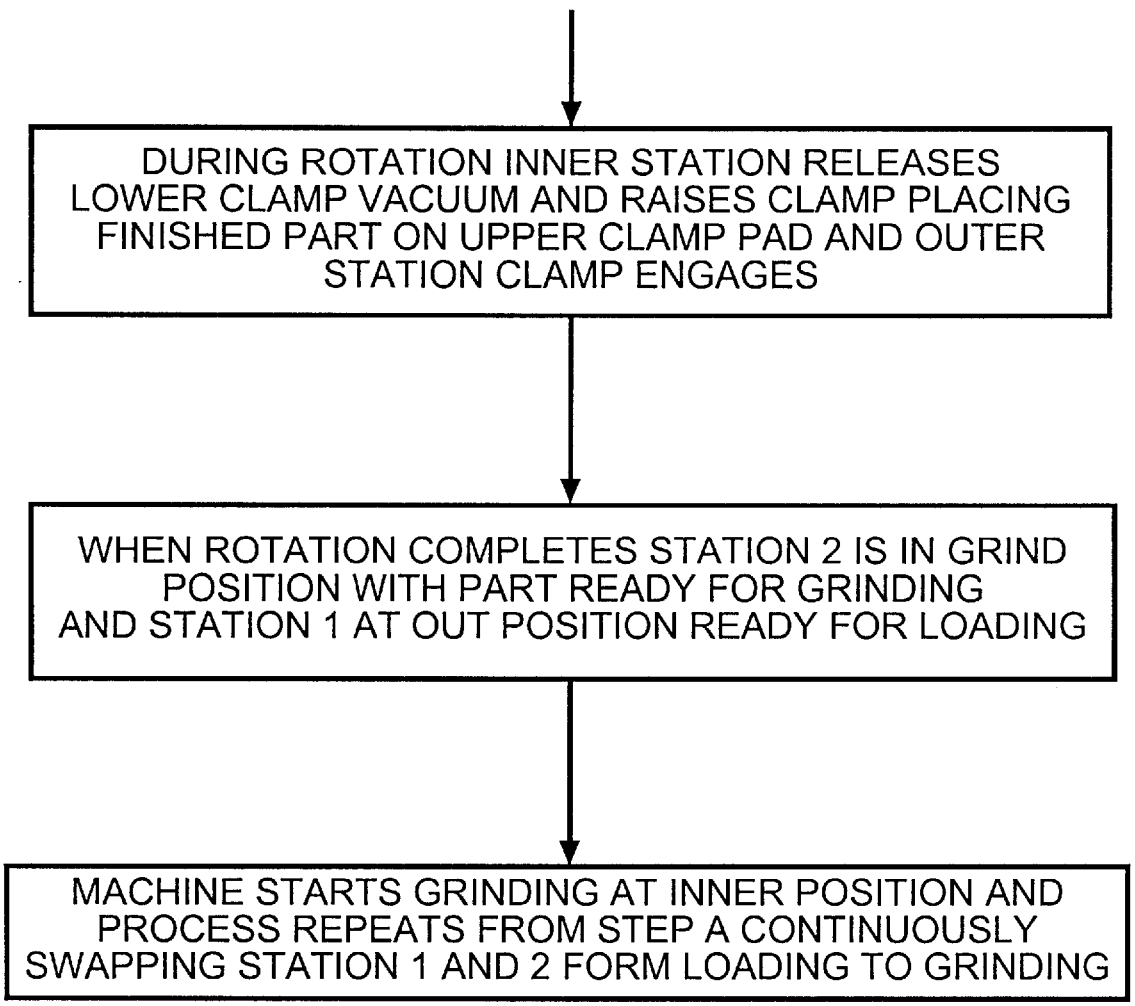

FIGS. 6A and 6B are a logical flow chart for positioning and operating CNC stations 14 and 16. Stations 14 and 16 hold blank S in a specified X, Y axis alignment. A vacuum device (not shown) transfers blank S to the stations maintaining that X, Y alignment. The vacuum device preferably is an overhead vacuum disk. The device, however, can be any vacuum table, sled or vacuum cup array. Maintaining X, Y alignment of blank S is the key.

The logic flow begins with station 1 in at the grinder and station 2 out at the load position. In Step A, the out position station is unclamped with a finished part on the top clamp, while the inner station is grinding a part. A load shuttle comes with the raw part to the out position while an unload shuttle comes to take the part off the clamp pad. The load shuttle places a part on the lower vacuum pad and the upper clamp pad releases vacuum placing the finished part on the unload shuttle. The lower vacuum turns on. When the control senses the vacuum pressure, the load shuttle releases the part. The load shuttle then moves out of the way to get another located raw part. The unload shuttle moves out of the way to place the finished part on a conveyor. When the inner station has completed grinding, rotation begins. During rotation, the outer station clamp and upper vacuum engages. During rotation, the inner station releases the lower clamp vacuum and raises the clamp, thereby placing the finished part on the upper clamp pad. When rotation completes, station 2 is in at the grind position with a part ready for grinding and station 1 is at the out position ready for loading. The machine starts grinding at the inner position and the process repeats from Step A continuously swapping station 1 and 2 from loading to grinding.

The CNC electrical cabinet consists of all components necessary to control the compact system. Typically, the main enclosure houses the CNC controller, servo amplifiers, the program logic controller and the adjustable frequency A.C. motor drives and other components necessary for the manual and automatic operation of the system. The CNC controller used is a dual CNC continuous path control that controls the X, Y and Z axes and each station.

For example, PLC 70 through motor 27 controls the horizontal X axis of grinder 28. PLC 70 through motor 31 controls the vertical Z axis of grinder 28. Rotating table 12 and the holding station adjacent grinder 28 controls the Y axis which allows for the three dimensional machining of a blank that has an irregular shape or bend (spacial curve).

While we use the term glass blank, the term also covers materials other than glass. The blank can be any part, sheet, pane and the like depending upon the tooling operations involved. The blank we use in this operation, however, is a small mirror for a vehicle side view mirror.

In addition to these embodiments, persons skilled in the art can see that numerous modifications and changes may be made to the above invention without departing from the intended spirit and scope thereof.

We claim:

1. An apparatus for machining a workpiece about three axes comprising:
   a tool for machining a workpiece;
   at least two holders fixed in position relative to each other such that a first holder is located in a first position remote from the tool and a second holder is located in a second position adjacent the tool, wherein the second holder retains a workpiece and operates in cooperation with the tool to machine the workpiece about three axes while the first holder is receiving a raw workpiece intended for machining;
   a rotating index table supporting the at least two holders, the index table operating to rotate the at least two holders such that, when the machining operation on the workpiece in the second holder is completed, the first holder retaining the raw workpiece is moved to the second position adjacent the tool and the second holder with the finished workpiece is moved to the first position remote from the tool, wherein the finished workpiece is removed from the second holder and another raw workpiece is positioned in the second holder while the workpiece retained in the first holder is being machined; and
   a controller for simultaneously controlling the table, the holders, the machining of the workpiece and the positioning of the tool and at least two holders to machine the workpiece on three axes.

2. An apparatus according to claim 1 wherein the tool includes a means for controlling the machining along a first horizontal axis and a vertical axis and wherein the at least two holders include a means for controlling the machining along a second horizontal axis.

3. An apparatus according to claim 1 wherein each holder includes a rotary servo motor, a lower vacuum pad, an upper vacuum pad with a pneumatic cylinder and a locating means attached to a lower side of the lower vacuum pad.

4. An apparatus according to claim 1 wherein the tool includes a drive for moving the tool in a horizontal direction along a first horizontal axis.

5. An apparatus according to claim 1 wherein the tool includes a drive for moving the tool in a, vertical direction along a vertical axis.

6. An apparatus according to claim 1 wherein the tool is a grinder.

7. An apparatus according to claim 1 wherein the tool is a rotary grinder.

8. An apparatus according to claim 1 wherein the controller includes a synchronization control for timing the machining of one workpiece and the unloading of a finished blank and the loading of a raw blank.

9. An apparatus according to claim 8 wherein the controller is programmed to move the tool and holder along a programmed path relative to the workpiece.

10. An apparatus according to claim 9 wherein the path is a combination of movement of the holder and tool on three axes.

11. An apparatus according to claim 1 wherein the apparatus is computer numerically controlled.

12. A process for machining a workpiece about three axes comprising the steps of:

a) providing a tool for tooling a workpiece;

b) locating a first workpiece proximate the tool and machining the first workpiece about three axes with the tool while, at the same time locating a second raw workpiece in a position remote from the tool;

c) after completion of machining of the first workpiece, removing the finished workpiece from its position proximate the tool and locating the second raw workpiece proximate the tool for machining;

d) machining the second raw workpiece about three axes and, at the same time unloading the finished workpiece and locating a new raw workpiece in a position remote from the tool;

e) simultaneously controlling the positioning of the workpieces, and the machining of the workpieces; and f) repeating steps b–e above.

13. A process according to claim 12 including the steps of controlling the machining along a first horizontal axis and a vertical axis and controlling movement of the workpiece along a second horizontal axis to provide machining on three axes.

* * * * *